US011563844B2

(12) United States Patent
Ramprasad

(10) Patent No.: US 11,563,844 B2
(45) Date of Patent: Jan. 24, 2023

(54) DEVICE, SYSTEM, AND PROCESS FOR UNLOCKING A WIRELESS DEVICE

(71) Applicant: TracFone Wireless, Inc., Miami, FL (US)

(72) Inventor: Satish Ramprasad, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 0 days.

(21) Appl. No.: 17/140,498

(22) Filed: Jan. 4, 2021

(65) Prior Publication Data

US 2021/0211537 A1    Jul. 8, 2021

Related U.S. Application Data

(60) Provisional application No. 62/956,869, filed on Jan. 3, 2020.

(51) Int. Cl.
*H04M 1/72463* (2021.01)
*H04M 1/72457* (2021.01)
*H04W 4/029* (2018.01)

(52) U.S. Cl.
CPC ... *H04M 1/72463* (2021.01); *H04M 1/72457* (2021.01); *H04W 4/029* (2018.02)

(58) Field of Classification Search
CPC ......... H04M 1/72463; H04M 1/72457; H04W 4/029
See application file for complete search history.

(56) References Cited

U.S. PATENT DOCUMENTS

2011/0130117 A1\* 6/2011 Fan .................. H04W 4/24
                                                            455/411
2018/0309754 A1\* 10/2018 Magadevan .......... H04W 12/37

\* cited by examiner

*Primary Examiner* — Minjung Kim

(57) ABSTRACT

A wireless device configured to temporarily unlock includes a processor configured to execute an unlocking application and a lock mechanism. The processor implementing the unlocking application to control the lock mechanism to unlock based on one of the following: the location provided by a location determination device or based on a time and date provided from the transceiver and/or the processor. A process to temporarily unlock a wireless device is also disclosed.

17 Claims, 7 Drawing Sheets

DEVICE, SYSTEM, AND PROCESS FOR UNLOCKING A WIRELESS DEVICE

CROSS-REFERENCE TO RELATED APPLICATIONS

This application claims the benefit of U.S. Provisional Application No. 62/956,869 filed on Jan. 3, 2020, which is hereby incorporated by reference in its entirety for all purposes as if fully set forth herein.

BACKGROUND OF THE DISCLOSURE

1. Field of the Disclosure

The disclosure relates to a device for unlocking a wireless device. Additionally, the disclosure relates to a system for unlocking a wireless device. Moreover, the disclosure relates to a process for unlocking a wireless device. Additionally, the disclosure relates to a device for temporarily unlocking and thereafter locking a wireless device. Moreover, the disclosure relates to a system for temporarily unlocking and thereafter locking a wireless device. Additionally, the disclosure relates to a process for temporarily unlocking and thereafter locking a wireless device.

2. Related Art

Wireless devices such as smartphones include a functionality to limit the ability to modify or obtain access to various assets of the wireless device, functions of the wireless device, and the like. This functionality is generally referred to as a SIM lock, a network lock, a carrier lock, a subsidy lock, a master subsidy lock, a locking mechanism, and/or the like (hereinafter locking mechanism). For example, smartphones and associated subscriber identity modules (SIM) used in the smartphones are typically strictly regulated with a locking mechanism in order to keep costs low and rate offerings attractive. In this regard, a locking mechanism built into smartphones can be typically used to provide this strict regulation. Network providers typically use this capability to restrict the use of these smartphones to specific countries, network providers, and/or the like. A smartphone can typically be unlocked by entering a code provided by the network operator. For example, a locked smartphone will typically display a message if a locked SIM is used, requesting the unlock code. Once a valid code is entered, the smartphone will typically be unlocked.

In this regard, smartphone users may benefit from unlocking a smartphone to utilize certain capabilities. For example, smartphone users may benefit from unlocking a smartphone when traveling internationally in order to operate the smartphone utilizing lower-cost wireless service provided by international wireless providers. However, network providers are hesitant to allow the unlocking of a smartphone as it may result in losing customers as well as other problems. Moreover, requests from smartphone users to network providers requesting assistance in the unlocking of smartphones can impact support services provided by network providers as such requests are time-consuming.

Accordingly, a more convenient and/or flexible approach is needed for unlocking wireless devices for users desiring unlocking of wireless devices to modify or obtain access to various assets or functions of the wireless device. Additionally, a more convenient and/or flexible approach is needed for unlocking wireless devices for users desiring temporary unlocking of wireless devices to modify or obtain access to various assets or functions of the wireless device.

SUMMARY OF THE DISCLOSURE

The disclosure provides a more convenient and/or flexible approach for unlocking wireless devices for users desiring unlocking of wireless devices to modify or obtain access to various assets or functions of the wireless device. The disclosure further provides a more convenient and/or flexible approach for unlocking wireless devices for users desiring temporary unlocking of wireless devices to modify or obtain access to various assets or functions of the wireless device.

Generally, companies that provide post-paid wireless services are wireless carriers or Mobile Network Operators (MNOs) that maintain and control their own wireless networks. An MNO heavily relies on backend systems to address any provisional, billing, security, and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data, number of voice minutes, and number of text messages used. The various features set forth in the disclosure may be applicable to both MVNOs and MNOs.

Convenience, timeliness, and reliability of wireless service are key factors that play into a user's experience. By developing a system to improve at least these factors, a more positive experience can be provided to the user. The improved experience will help retain customer base and increase the number of customers willing to purchase wireless services from MNOs and MVNOs. In order to do so, the following needs can be addressed by a device, system, and/or process for unlocking a wireless device. Additionally, the following needs can be addressed by a device, system, and/or process for temporarily unlocking and thereafter locking a wireless device.

The foregoing needs are met, to a great extent, by the disclosure, providing a more convenient and/or flexible approach for unlocking wireless devices for users desiring unlocking of wireless devices to modify or obtain access to various assets or functions of the wireless device. The foregoing needs are further met, to a great extent, by the disclosure, providing a more convenient and/or flexible approach for unlocking wireless devices for users desiring temporary unlocking of wireless devices to modify or obtain access to various assets or functions of the wireless device. The foregoing needs are further met, to a great extent, by the disclosure, providing a more convenient and/or flexible approach for unlocking wireless devices for users desiring temporary unlocking of wireless devices to obtain wireless service while traveling internationally.

One general aspect includes a wireless device configured to temporarily unlock including a non-transitory memory configured to store instructions to implement an unlocking application, a display configured to display a user interface having a prompt to input information in response to the unlocking application, a transceiver configured to wirelessly communicate with a wireless network, a processor, operatively coupled to the non-transitory memory and the display, the processor configured to execute the unlocking application, a lock mechanism configured to lock one of the following: a specific feature, a specific purpose, a specific asset, multiple features, multiple purposes, or multiple assets, a location determination device configured to estimate a location of the wireless device, the processor implementing the unlocking application being configured to control the lock mechanism to unlock one of the following: a specific feature, a specific purpose, a specific asset, multiple features, multiple purposes, or multiple assets, and the processor implementing the unlocking application being configured to control the lock mechanism to unlock based on one of the following: the location provided by the location determination device or based on a time and date provided from the transceiver and/or the processor. Other embodiments of this aspect include corresponding computer systems, apparatus, and computer programs recorded on one or more computer storage devices, each configured to perform the actions of the methods.

One general aspect includes a process for temporarily unlocking a wireless device including storing instructions to implement an unlocking application in a non-transitory memory, displaying a user interface having a prompt to input information in response to the unlocking application on a display, wirelessly communicating with a wireless network with a transceiver, executing the unlocking application with a processor, operatively coupled to the non-transitory memory and the display, configuring a lock mechanism to lock one of the following: a specific feature, a specific purpose, a specific asset, multiple features, multiple purposes, or multiple assets, estimating a location of the wireless device with a location determination device, implementing the unlocking application with the processor to control the lock mechanism to unlock one of the following: a specific feature, a specific purpose, a specific asset, multiple features, multiple purposes, or multiple assets, and implementing the unlocking application with the processor to control the lock mechanism to unlock based on one of the following: the location provided by the location determination device or based on a time and date provided from the transceiver and/or the processor. Other embodiments of this aspect include corresponding computer systems, apparatus, and computer programs recorded on one or more computer storage devices, each configured to perform the actions of the methods.

One general aspect includes a wireless device configured to temporarily unlock including a non-transitory memory configured to store instructions to implement an unlocking application, a display configured to display a user interface having a prompt to input information in response to the unlocking application, a transceiver configured to wirelessly communicate with a wireless network, a processor, operatively coupled to the non-transitory memory and the display, the processor configured to execute the unlocking application, a lock mechanism configured to lock one of the following: a specific feature, a specific purpose, a specific asset, multiple features, multiple purposes, or multiple assets, a location determination device configured to estimate a location of the wireless device, the processor implementing the unlocking application being configured to control the lock mechanism to unlock one of the following: a specific feature, a specific purpose, a specific asset, multiple features, multiple purposes, or multiple assets, the processor implementing the unlocking application being configured to control the lock mechanism to unlock based on one of the following: the location provided by the location determination device or based on a time and date provided from the transceiver and/or the processor, the processor implementing the unlocking application being configured to control the lock mechanism to lock one of the following: a specific feature, a specific purpose, a specific asset, multiple features, multiple purposes, or multiple assets, and the processor implementing the unlocking application being configured to control the lock mechanism to lock based on one of the following: the location provided by the location determination device or based on a time and date provided from the transceiver and/or the processor.

Other embodiments of this aspect include corresponding computer systems, apparatus, and computer programs recorded on one or more computer storage devices, each configured to perform the actions of the methods.

In one aspect, a method of subsidy unlock of a mobile device is disclosed, wherein the mobile device can be securely unlocked for a certain duration of time. After such a time span is elapsed, the mobile device returns to be in the subsidy locked state. The time span is accurately determined by checking against the network time, an atomic clock, or a registration server. In one aspect, a method of subsidy unlock of a mobile device is disclosed, wherein the mobile device can be securely unlocked for a certain region, during the period of time, as described above. In one aspect, the unlock code described here embeds encoded information on the device, the region, and the time duration of the device being unlocked.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above-mentioned features and aspects of the disclosure will become more apparent with reference to the following description taken in conjunction with the accompanying drawings wherein like reference numerals denote like elements and in which.

DETAILED DESCRIPTION

In this specification and claims it is to be understood that reference to a wireless device is intended to encompass electronic devices such as smartphones, tablet computers, gaming systems, MP3 players, personal computers, PDAs, and the like. A "wireless device" is intended to encompass any compatible mobile technology computing device that can connect to a wireless communication network, such as smartphones, mobile equipment, mobile stations, user equipment, cellular phones, smartphones, handsets, and/or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "smartphones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network, 5G network, that may utilize the teachings of the present application to sell, activate, monitor, redeem, authorize, and/or track, the provisioning of one or more wireless services.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not for other aspects.

Figure 1:
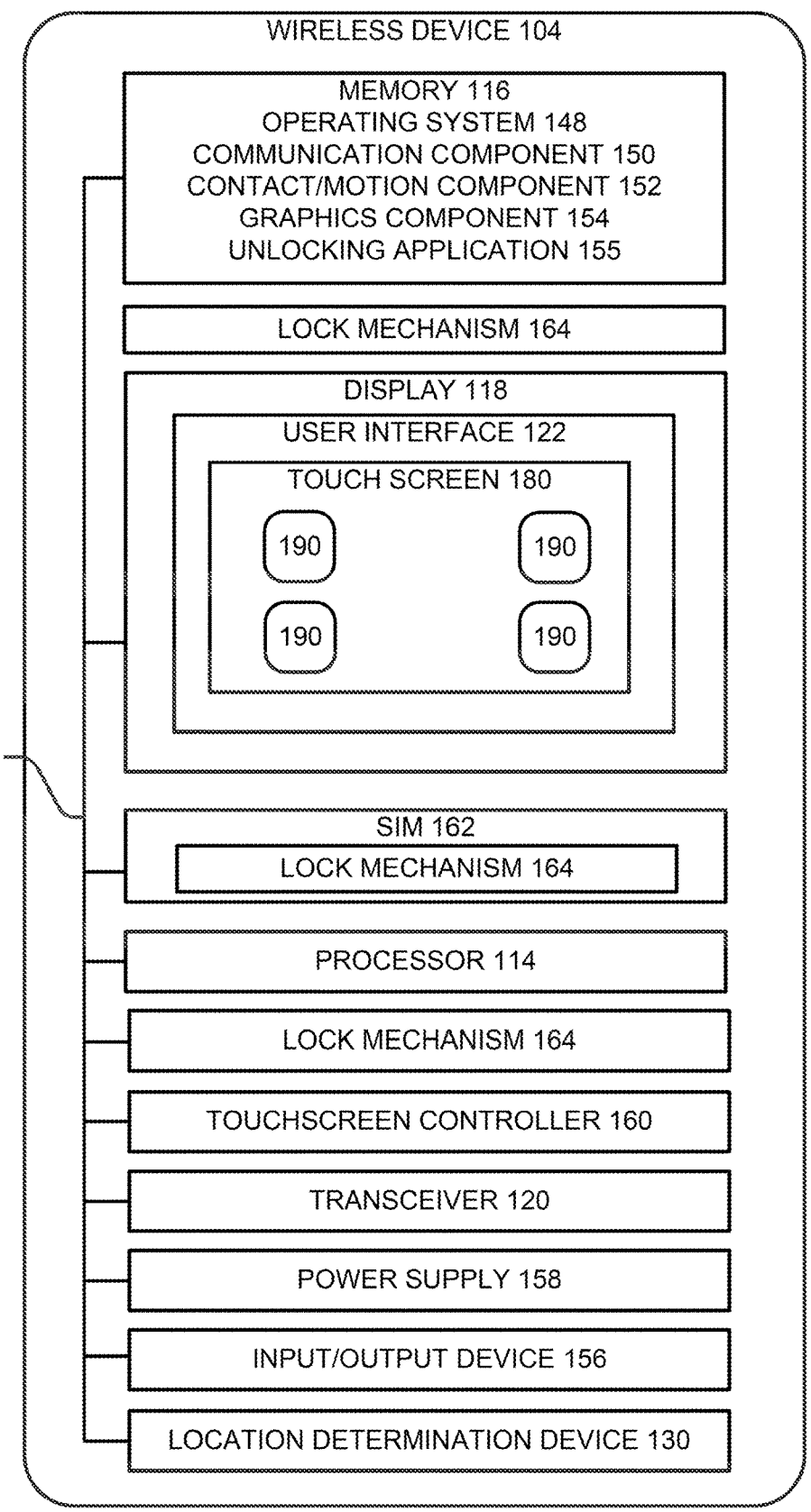
FIG. 1 illustrates a block diagram of a wireless device with exemplary components in accordance with aspects of the disclosure.

FIG. 1 illustrates a block diagram of a wireless device with exemplary components in accordance with aspects of the disclosure.

In particular, FIG. 1 illustrates a wireless device 104 that may include a processor 114, a memory 116, a transceiver 120, and a user interface 122. The processor 114 may be a central processing unit configured to execute instructions such as instructions related to software programs. Any type of processor may be implemented as the processor 114 for the wireless device 104 as understood to those of ordinary skill in the art. In various aspects, the processor 114 may be a microprocessor, a chipset, and/or the like.

The processor 114 may be configured to process call functions, provide other services to the user, and may also operate in conjunction with a lock mechanism 164. It should be noted that the lock mechanism 164 may also exist on a subscriber identification module (SIM) 162, on dedicated hardware including semiconductors, application specific integrated circuits (ASIC), programmable logic arrays, other hardware devices, the memory 116, the processor 114, other components of the wireless device 104, and/or the like.

The lock mechanism 164 may be implemented as a SIM lock, a network lock, a carrier lock, a subsidy lock, a master subsidy lock, a locking mechanism, Service Programming Code (SPC), a Master Subsidy Lock (MSL) Lock, a Universal Serial Bus (USB) lock, a port access lock, and/or the like. The lock mechanism 164 may be implemented to lock a specific feature, a specific purpose, a specific asset, multiple features, multiple purposes, multiple assets, and/or the like.

The memory 116 of the wireless device 104 may include an unlocking application 155. The unlocking application 155 may be preinstalled, downloaded from an application store, and/or the like. The unlocking application 155 may be configured to unlock a specific feature, a specific purpose, a specific asset, multiple features, multiple purposes, multiple assets, and/or the like. Moreover, the unlocking application 155 may be configured to temporarily unlock a specific feature, a specific purpose, a specific asset, multiple features, multiple purposes, multiple assets, and/or the like. Additionally, the unlocking application 155 may be configured to temporarily unlock and thereafter relock a specific feature, a specific purpose, a specific asset, multiple features, multiple purposes, multiple assets, and/or the like. In one aspect, the unlocking application 155 may include an unlock code. In one aspect, the unlocking application 155 may embed encoded information on the wireless device 104. In one aspect, the unlocking application 155 may embed encoded information on the wireless device 104 including a region and/or a time duration of the wireless device 104 being unlocked. In one aspect, the unlocking application 155 may include an unlock code and may embed encoded information on the wireless device 104, including a region and/or a time duration of the wireless device 104 being unlocked. In one aspect, the unlocking application 155 may unlock the wireless device for utilizing international wireless service from the international wireless service provider.

In other aspects, the unlocking application 155 may be implemented on dedicated hardware including semiconductors, application specific integrated circuits (ASIC), programmable logic arrays, other hardware devices, the memory 116, the processor 114, other components of the wireless device 104, and/or the like.

In this regard, the unlocking application 155 may operate to provide a code, a command, a signal, and/or the like to control to the lock mechanism 164 or the like to unlock a specific feature, a specific purpose, a specific asset, multiple features, multiple purposes, multiple assets, and/or the like. In one aspect, the unlocking application 155 may unlock the wireless device for utilizing international wireless service from the international wireless service provider.

In one aspect, the unlocking application 155 may operate within the wireless device 104. In one aspect, the unlocking application 155 may operate within the wireless device 104 without the need to receive external commands or the like from a wireless provider. In one aspect, the unlocking application 155 may operate within the wireless device 104 and may receive external commands or the like from a wireless provider. In one aspect, the unlocking application 155 may operate within the wireless device 104 and may require external commands or the like from a wireless provider. Further details of the unlocking application 155 are described herein.

The wireless device 104 may include a SIM 162. The SIM 162 may be an integrated circuit that may store an International Mobile Subscriber Identity (IMSI) and also may store a key used to identify and authenticate subscribers on the wireless device 104 and other devices. The SIM 162 may be configured to be transferred between different mobile devices. The SIM 162 may also store network-specific information used to authenticate and identify subscribers on the network 716. The network-specific information may include the ICCID, Authentication Key (Ki), Local Area Identity (LAI), Operator-Specific Emergency Number, and so on. In other aspects, the wireless device 104 may be implemented without a SIM 162.

The display 118 may be a liquid crystal display (LCD), light-emitting diode (LED) display, and/or the like. The display 118 may include a backlight to illuminate the various color liquid crystals to provide a more colorful display. The user interface 122 may be any type of physical input as readily employed in the field. For example, the user interface 122 may have physical buttons. Alternatively, the user interface 122 may be implemented on a touchscreen 180, a motion sensor (not shown), and the like. Finally, the wireless device 104 may include a power supply 158.

The memory 116 of the wireless device 104 may further include an operating system 148, a communication component 150, a contact/motion component 152, a graphics component 154, and the like. The operating system 148 together with the various components provides software functionality for each of the components of the wireless device 104. The memory 116 may include a high-speed, random-access memory. Also, the memory 116 may be a non-volatile memory, such as magnetic fixed disk storage, SIM, UICC, cloud-based memory, flash memory or the like. These various components may be connected through various communication lines including a data bus 170.

The wireless device 104 can include an audio input/output device 156. The audio input/output device 156 may include speakers, speaker outputs, and the like, providing sound output; and may include microphones, microphone inputs, and the like, for receiving sound inputs. In an exemplary aspect, the audio input/output device 156 may include an analog to digital converter and a digital to audio converter for audio input and output functions respectively.

In some aspects, the wireless device 104 may implement geolocation and/or estimate a location of the wireless device 104 based, at least in part, on a global navigation satellite system (GNSS) with a location determination device 130. In another aspect, a wireless network may secure location determination based on a specific cell in which the wireless device 104 connects. In yet another aspect, a wireless network may obtain location determination based on triangulation with respect to a plurality of cells in which the wireless device 104 receives signals.

In one aspect, the location of the wireless device 104 may be provided to the unlocking application 155 from the location determination device 130, the wireless network, and/or the processor 114. In this regard, the unlocking application 155 may operate to provide a code, a command, a signal, and/or the like to control to the lock mechanism 164 or the like to unlock a specific feature, a specific purpose, a specific asset, multiple features, multiple purposes, multiple assets, and/or the like based on the location provided by the location determination device 130. In one aspect, the unlocking application 155 may unlock the wireless device for utilizing international wireless service from the international wireless service provider based on the location provided by the location determination device 130. Moreover, the unlocking application 155 may operate to provide a code, a command, a signal, and/or the like to control to the lock mechanism 164 or the like to lock a specific feature, a specific purpose, a specific asset, multiple features, multiple purposes, multiple assets, and/or the like based on the location provided by the location determination device 130.

The transceiver 120 and/or the processor 114 may provide radio and signal processing as needed to access a wireless network for services. The transceiver 120 and/or the processor 114 may be configured to process call functions, data transfer, and the like and provide an array of services, based on those functions, to the user. In one aspect, the transceiver 120 and/or the processor 114 may determine a time and date from a network time implemented by a wireless service provider, a registration server implemented by a wireless service provider, an atomic clock implemented by a wireless service provider, and/or the like.

In one aspect, the time and date may be provided to the unlocking application 155 from the transceiver 120 and/or the processor 114. In this regard, the unlocking application 155 may operate to provide a code, a command, a signal, and/or the like to control to the lock mechanism 164 or the like to unlock a specific feature, a specific purpose, a specific asset, multiple features, multiple purposes, multiple assets, and/or the like based on the time and date provided from the transceiver 120 and/or the processor 114. In one aspect, the unlocking application 155 may unlock the wireless device for utilizing international wireless service from the international wireless service provider based on the time and date provided from the transceiver 120 and/or the processor 114. Moreover, the unlocking application 155 may operate to provide a code, a command, a signal, and/or the like to control to the lock mechanism 164 or the like to lock a specific feature, a specific purpose, a specific asset, multiple features, multiple purposes, multiple assets, and/or the like based on the time and date provided from the transceiver 120 and/or the processor 114.

In an exemplary aspect, the touchscreen 180 of the disclosure may be implemented in the display 118 and may detect a presence and location of a touch of a user within the display area. For example, touching the display 118 of the wireless device 104 with a finger or hand. The touchscreen 180 may also sense other passive objects, such as a stylus. Additionally, the wireless device 104 may further include a touch screen controller 160.

In one operation, the display 118 may show various objects 190 associated with applications for execution by the processor 114. For example, a user may touch the display 118, particularly the touchscreen 180, to interact with the objects 190. That is, touching an object 190 may execute an application in the processor 114 associated with the object 190 that is stored in memory 116. Additionally or alternatively, touching an object 190 may open a menu of options to be selected by the user. The display 118 may include a plurality of objects 190 for the user to interact with. Moreover, the display 118 may include a plurality of screens. The display 118 showing one screen at a time. The user may interact with the display 118 to move a screen into view on the display 118. Various objects 190 may be located in each of the screens.

The touchscreen 180 may be implemented as a resistive touchscreen, a surface acoustic wave touch screen, a capacitive touchscreen, self-capacitance sensors, infrared sensors, dispersive signal technology, acoustic pulse recognition, and/or the like.

The display 118 is generally configured to display a user interface 122 or graphical user interface (GUI) that provides an easy to use visual interface between a user of the wireless device 104 and the operating system or application(s) running on the wireless device 104. Generally, the GUI presents programs, files, and operational options with graphical images. During operation, the user may select and activate various graphical images displayed on the display 118 in order to initiate functions and tasks associated therewith.

In another aspect of the disclosure, the memory 116 of the wireless device 104 can include a database for storing user information. The user information may include information such as full name, address, email address, contact number, credit card information, and the like. In one aspect, the database may include security questions. In another aspect, the database may include user specified preferences.

Figure 2:
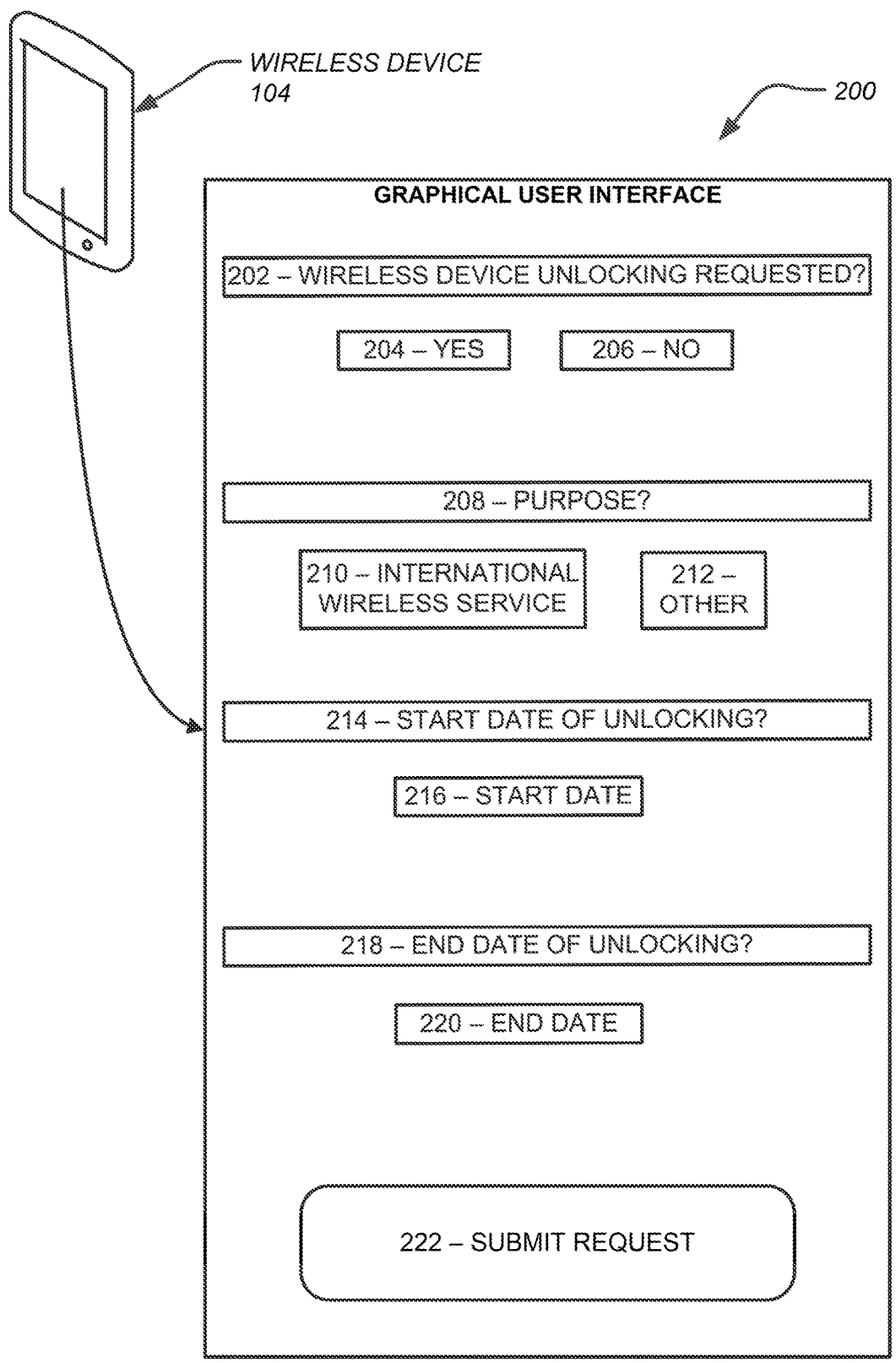
FIG. 2 illustrates a graphical user interface in accordance with aspects of the disclosure.

FIG. 2 illustrates a graphical user interface in accordance with aspects of the disclosure.

In this regard, aspects related to FIG. 2 may include any one or more features, processes, and/or the like as described herein. In this regard, the unlocking application 155, the display 118, and/or the processor 114, may generate a graphical user interface 200 on the wireless device 104. The graphical user interface 200 may generate, display, and/or include one or more queries, may generate, display, and/or include one or more virtual buttons or similar input features, may generate, display, and/or include one or more input features, and/or the like to control the unlocking application 155 to implement the various features of the disclosure as described herein. The graphical user interface 200 may be implemented in a single screen or in multiple screens.

The graphical user interface 200 may generate, display, and/or include a query to the user on one or more screens requesting whether the user desires wireless device unlocking 202. In this regard, the language of the query may be the same or different from that indicated in FIG. 2.

The graphical user interface 200 may generate, display, and/or include one or more virtual buttons or similar input features to receive an input with respect to whether the user desires wireless device unlocking 202. In this regard, the graphical user interface 200 may generate, display, and/or include a virtual button for yes 204 for indicating that the user desires wireless device unlocking 202. Additionally, the graphical user interface 200 may generate, display, and/or include a virtual button for no 206 for indicating that the user does not wireless device unlocking 202. In conjunction with the processor 114, the graphical user interface 200, and/or the unlocking application 155, the input provided to the graphical user interface 200 may be captured and stored for further use as described herein.

The graphical user interface 200 may generate, display, and/or include a query to the user on one or more screens requesting a purpose 208 for the wireless device unlocking. In this regard, the language of the query may be the same or different from that indicated in FIG. 2.

The graphical user interface 200 may generate, display, and/or include one or more virtual buttons or similar input features to receive an input with respect to the purpose 208. In this regard, the graphical user interface 200 may generate, display, and/or include a virtual button or similar input future for international wireless service 210 for indicating that the user desires wireless device unlocking for international wireless service. Additionally, the graphical user interface 200 may generate, display, and/or include a virtual button or similar input future for other 212 for indicating that the user desires wireless device unlocking for other purposes. In conjunction with the processor 114, the graphical user interface 200, and/or the unlocking application 155, the input provided to the graphical user interface 200 may be captured and stored for further use as described herein.

The graphical user interface 200 may generate, display, and/or include a query to the user on one or more screens requesting a start date of unlocking 214 for the wireless device unlocking. In this regard, the language of the query may be the same or different from that indicated in FIG. 2.

The graphical user interface 200 may generate, display, and/or include one or more virtual buttons or similar input features to receive an input with respect to the start date of unlocking 214. In this regard, the graphical user interface 200 may display an input box or similar input feature for inputting the start date 216 the user desires wireless device unlocking. The input may include a day, a date, a date and time, and/or the like. In conjunction with the processor 114, the graphical user interface 200, and/or the unlocking application 155, the input provided to the graphical user interface 200 may be captured and stored for further use as described herein.

The graphical user interface 200 may generate, display, and/or include a query to the user on one or more screens requesting end date of unlocking 218 for the wireless device unlocking. In this regard, the language of the query may be the same or different from that indicated in FIG. 2.

The graphical user interface 200 may generate, display, and/or include one or more virtual buttons or similar input features to receive an input with respect to the end date 220. In this regard, the graphical user interface 200 may generate, display, and/or include an input box or similar input feature for indicating the end date 220 the user desires wireless device unlocking. The input may include a day, a date, a date and time, and/or the like. In conjunction with the processor 114, the graphical user interface 200, and/or the unlocking application 155, the input provided to the graphical user interface 200 may be captured and stored for further use as described herein.

The graphical user interface 200 may generate, display, and/or include a query to the user on one or more screens requesting to submit a request 222 for the wireless device unlocking. In this regard, the language of the query may be the same or different from that indicated in FIG. 2.

The graphical user interface 200 may generate, display, and/or include one or more virtual buttons or similar input features to receive an input with respect to submitting a request 222 wireless device unlocking. In conjunction with the processor 114, the graphical user interface 200, and/or the unlocking application 155, the input provided to the graphical user interface 200 may be captured and stored for further use as described herein. In some aspects, the wireless device 104 may also connect with a wireless system 722 (described below in relation to FIG. 7) to provide the various information captured by the graphical user interface 200 as well as any other information from the wireless device 104 for the implementing an unlocking process. In some aspects, the wireless device 104 may also connect with a wireless system 722 to obtain additional information, signaling, instructions, commands, and the like for implementing an unlocking process.

Figure 3:
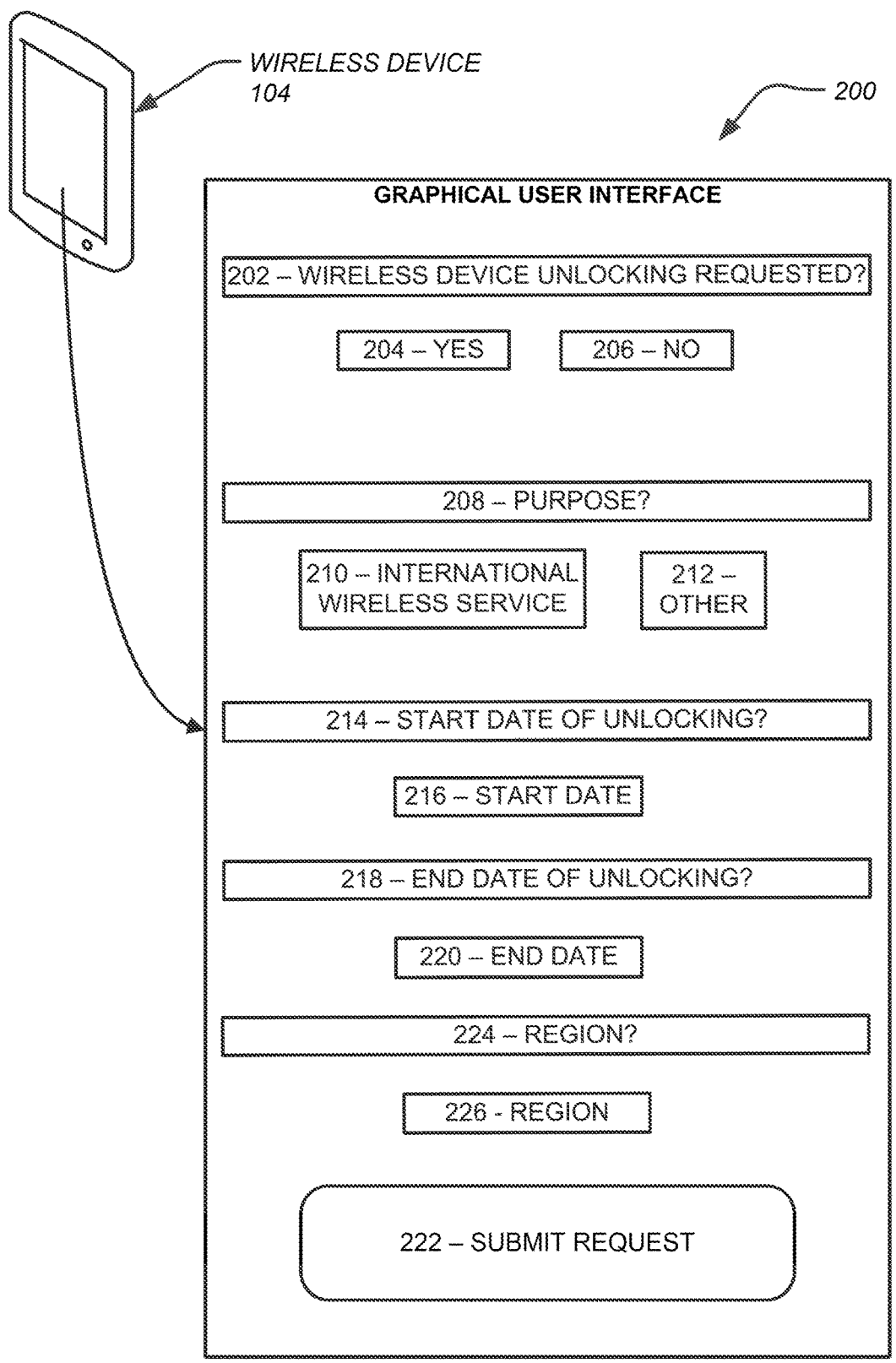
FIG. 3 illustrates a graphical user interface in accordance with aspects of the disclosure.

FIG. 3 illustrates a graphical user interface in accordance with aspects of the disclosure.

In this regard, aspects related to FIG. 3 may include any one or more features, processes, and/or the like as described herein. In particular, aspects related to FIG. 3 may include features disclosed with respect to FIG. 2. Further with respect to FIG. 3, the graphical user interface 200 may generate, display, and/or include a query to the user on one or more screens requesting a region 224 for the wireless device unlocking. In this regard, the language of the query may be the same or different from that indicated in FIG. 3.

The graphical user interface 200 may generate, display, and/or include one or more virtual buttons or similar input features to receive an input with respect to the region 226. In this regard, the graphical user interface 200 may display an input box or similar input feature for inputting the region 226 the user desires wireless device unlocking. The input may include a country, region, continent, and/or the like. In conjunction with the processor 114, the graphical user interface 200, and/or the unlocking application 155, the input provided to the graphical user interface 200 may be captured and stored for further use as described herein.

The graphical user interface 200 may generate, display, and/or include one or more virtual buttons or similar input features to receive an input with respect to submitting a request 222 wireless device unlocking. In conjunction with the processor 114, the graphical user interface 200, and/or the unlocking application 155, the input provided to the graphical user interface 200 may be captured and stored for further use as described herein. In some aspects, the wireless device 104 may also connect with a wireless system 722 to provide the various information captured by the graphical user interface 200 as well as any other information from the wireless device 104 for the implementing an unlocking process. In some aspects, the wireless device 104 may also connect with a wireless system 722 to obtain additional information, signaling, instructions, commands, and the like for the implementing an unlocking process.

The graphical user interface 200 may generate, display, and/or include input portions as described herein and/or illustrated in FIG. 2 and/or FIG. 3. The input portions may be configured for keyed in data, data selection by drop-down boxes, data selection by selection from a list, data selection by a drop-down list, data selection by radio buttons, input data by voice recognition, and/or the like.

Figure 4:
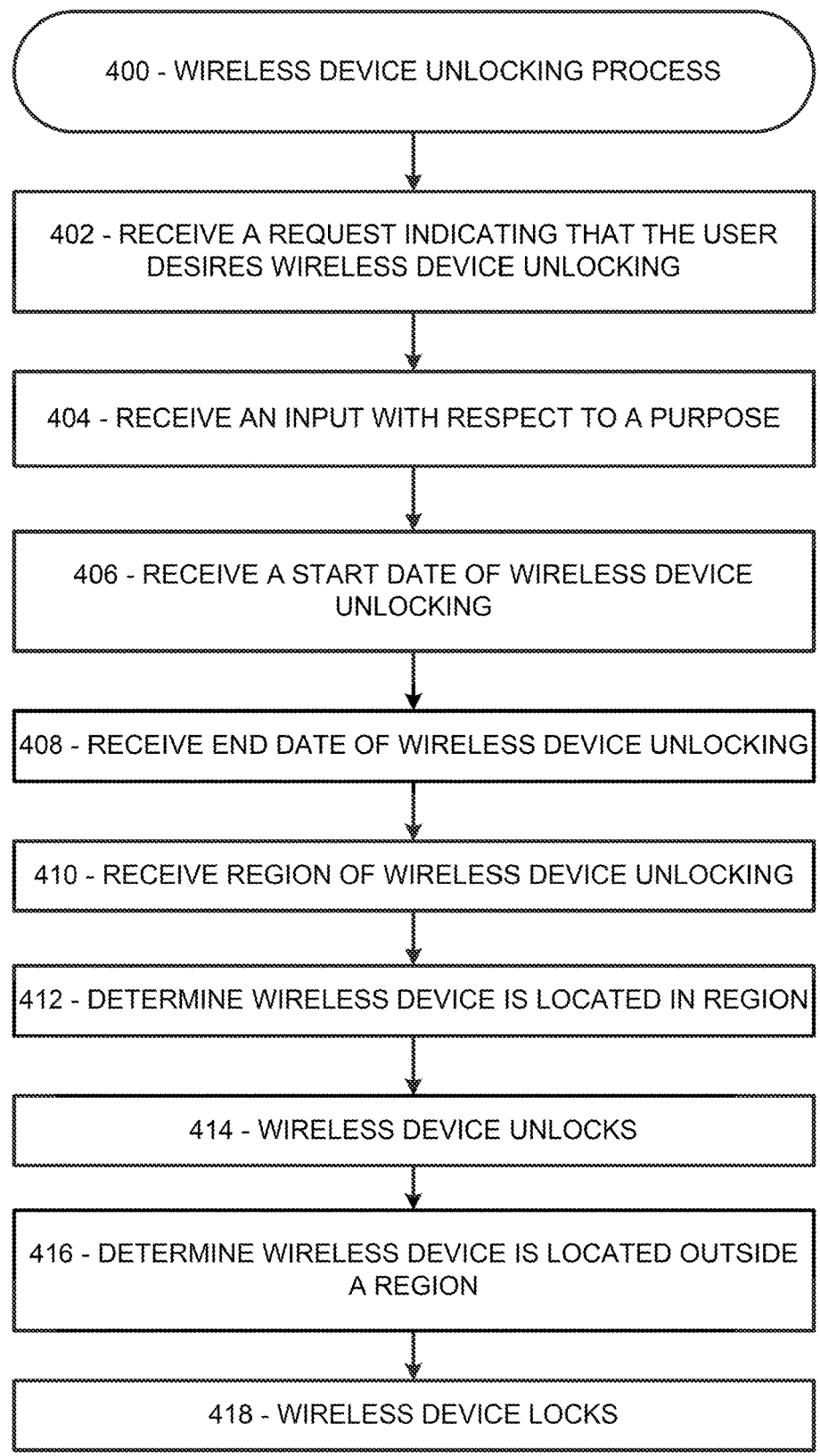
FIG. 4 illustrates an exemplary process that may be used to implement wireless device unlocking according to aspects of the disclosure.

FIG. 4 illustrates an exemplary process that may be used to implement wireless device unlocking according to aspects of the disclosure.

In particular, FIG. 4 illustrates a wireless device unlocking process 400 as described herein. It should be noted that the aspects of the wireless device unlocking process 400 may be performed in a different order consistent with the aspects described herein. Moreover, the wireless device unlocking process 400 may be modified to have more or fewer processes consistent with the various aspects disclosed herein. In this regard, aspects related to FIG. 4 may include any one or more features, processes, and/or the like as described herein. Additionally, the wireless device unlocking process 400 may be implemented by the wireless device 104, the processor 114, and/or the like.

The wireless device unlocking process 400 may include receiving a request indicating that the user desires wireless device unlocking 402. This part of the process 400 may be associated with the graphical user interface 200 illustrated in FIG. 2 and/or FIG. 3 and the associated description thereof. However, this part of the process 400 may be implemented alternatively consistent with the disclosure. The receiving a request indicating that the user desires wireless device unlocking 402 may include receiving data with an input portion that may be keyed in data, data selection by drop-down boxes, data selection by selection from a list, data selection by a drop-down list, data selection by radio buttons, input data by voice recognition, and/or the like.

The wireless device unlocking process 400 may include receiving an input with respect to a purpose 404. This part of the process 400 may be associated with the graphical user interface 200 illustrated in FIG. 2 and/or FIG. 3 and the associated description thereof. However, this part of the process 400 may be implemented alternatively consistent with the disclosure. The receiving an input with respect to a purpose 404 may include receiving data with an input portion that may be keyed in data, data selection by drop-down boxes, data selection by selection from a list, data selection by a drop-down list, data selection by radio buttons, input data by voice recognition, and/or the like.

The wireless device unlocking process 400 may include receiving a start date of wireless device unlocking 406. This part of the process 400 may be associated with the graphical user interface 200 illustrated in FIG. 2 and/or FIG. 3 and the associated description thereof. However, this part of the process 400 may be implemented alternatively consistent with the disclosure. The receiving a start date of wireless device unlocking 406 may include receiving data with an input portion that may be keyed in data, data selection by drop-down boxes, data selection by selection from a list, data selection by a drop-down list, data selection by radio buttons, input data by voice recognition, and/or the like.

The wireless device unlocking process 400 may include receiving an end date of wireless device unlocking 408. This part of the process 400 may be associated with the graphical user interface 200 illustrated in FIG. 2 and/or FIG. 3 and the associated description thereof. The receiving an end date of wireless device unlocking 408 may include receiving data with an input portion that may be keyed in data, data selection by drop-down boxes, data selection by selection from a list, data selection by a drop-down list, data selection by radio buttons, input data by voice recognition, and/or the like. However, this part of the process 400 may be implemented alternatively consistent with the disclosure.

The wireless device unlocking process 400 may include receiving a region of wireless device unlocking 410. This part of the process 400 may be associated with the graphical user interface 200 illustrated in FIG. 2 and/or FIG. 3 and the associated description thereof. The receiving a region of wireless device unlocking 410 may include receiving data with an input portion that may be keyed in data, data selection by drop-down boxes, data selection by selection from a list, data selection by a drop-down list, data selection by radio buttons, input data by voice recognition, and/or the like. However, this part of the process 400 may be implemented alternatively consistent with the disclosure.

The wireless device unlocking process 400 may include determining a wireless device is located in a region 412. This part of the process 400 may be associated with the graphical user interface 200 illustrated in FIG. 2 and/or FIG. 3 and the associated description thereof. However, this part of the process 400 may be implemented alternatively consistent with the disclosure. In one aspect, the location of the wireless device 104 may be provided to the unlocking application 155 from the location determination device 130, the wireless network, and/or the processor 114.

The wireless device unlocking process 400 may include unlocking the wireless device 414 when wireless device 104 is located in a region 412. This part of the process 400 may be associated with the graphical user interface 200 illustrated in FIG. 2 and/or FIG. 3 and the associated description thereof. However, this part of the process 400 may be implemented alternatively consistent with the disclosure. In this regard, the unlocking application 155 may operate to provide a code, a command, a signal, and/or the like to control to the lock mechanism 164 or the like to unlock a specific feature, a specific purpose, a specific asset, multiple features, multiple purposes, multiple assets, and/or the like based on the location provided by the location determination device 130. In one aspect, the unlocking application 155 may unlock the wireless device for utilizing international wireless service from the international wireless service provider based on the location provided by the location determination device 130.

The wireless device unlocking process 400 may include determining whether the wireless device 104 is located outside a region 416. This part of the process 400 may be associated with the graphical user interface 200 illustrated in FIG. 2 and/or FIG. 3 and the associated description thereof. However, this part of the process 400 may be implemented alternatively consistent with the disclosure. In one aspect, the location of the wireless device 104 may be provided to the unlocking application 155 from the location determination device 130, the wireless network, and/or the processor 114.

The wireless device unlocking process 400 may include locking the wireless device 418 when the wireless device 104 is located outside a region 416. This part of the process 400 may be associated with the graphical user interface 200 illustrated in FIG. 2 and/or FIG. 3 and the associated description thereof. However, this part of the process 400 may be implemented alternatively consistent with the disclosure.

In one aspect, the location of the wireless device 104 may be provided to the unlocking application 155 from the location determination device 130, the wireless network, and/or the processor 114. Moreover, the unlocking application 155 may operate to provide a code, a command, a signal, and/or the like to control to the lock mechanism 164 or the like to lock a specific feature, a specific purpose, a specific asset, multiple features, multiple purposes, multiple assets, and/or the like based on the location provided by the location determination device 130.

In some aspects, the wireless device 104 may also connect with a wireless system 722 to provide the various information captured by the graphical user interface 200 as well as any other information from the wireless device 104 for the implementing an unlocking process. In some aspects, the wireless device 104 may also connect with a wireless system 722 to obtain additional information, signaling, instructions, commands, and the like for the implementing an unlocking process.

Figure 5:
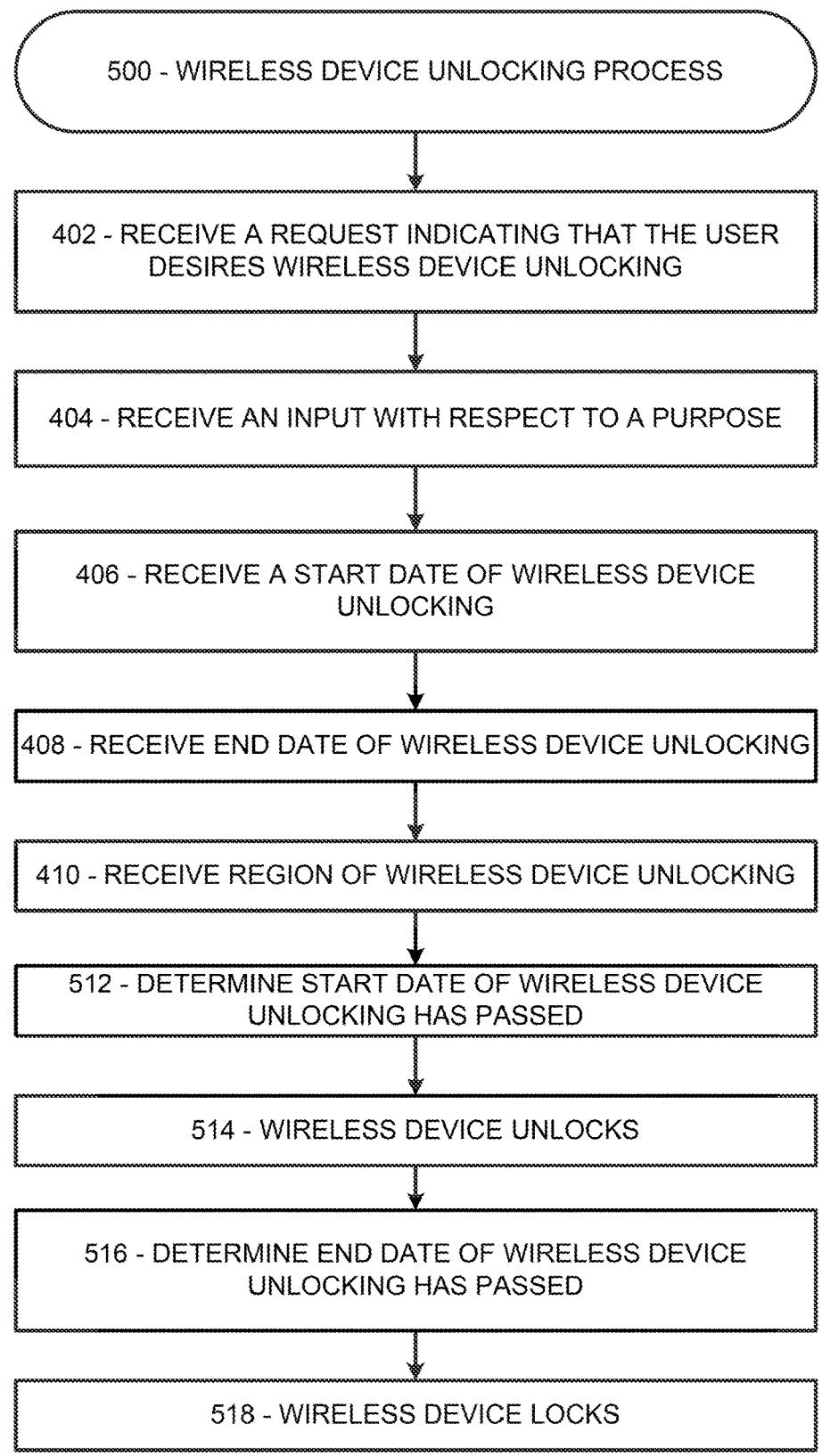
FIG. 5 illustrates an exemplary process that may be used to implement wireless device unlocking according to aspects of the disclosure.

FIG. 5 illustrates an exemplary process that may be used to implement wireless device unlocking according to aspects of the disclosure.

In particular, FIG. 5 illustrates a wireless device unlocking process 500 as described herein. It should be noted that the aspects of the wireless device unlocking process 500 may be performed in a different order consistent with the aspects described herein. Moreover, the wireless device unlocking process 500 may be modified to have more or fewer processes consistent with the various aspects disclosed herein. In this regard, aspects related to FIG. 5 may include any one or more features, processes, and/or the like as described herein. In particular, aspects related to FIG. 5 may include any one or more features, processes, and/or the like as described with respect to FIG. 4. Additionally, the wireless device unlocking process 500 may be implemented by the wireless device 104, the processor 114, and/or the like.

The wireless device unlocking process 500 may include determining a start date of wireless device unlocking has passed 512. This part of the process 500 may be associated with the graphical user interface 200 illustrated in FIG. 2 and/or FIG. 3 and the associated description thereof. However, this part of the process 500 may be implemented alternatively consistent with the disclosure. In one aspect, the time and date may be provided to the unlocking application 155 from the transceiver 120 and/or the processor 114.

The wireless device unlocking process 500 may include unlocking the wireless device 514. This part of the process 500 may be associated with the graphical user interface 200 illustrated in FIG. 2 and/or FIG. 3 and the associated description thereof. However, this part of the process 500 may be implemented alternatively consistent with the disclosure.

In this regard, the unlocking application 155 may operate to provide a code, a command, a signal, and/or the like to control to the lock mechanism 164 or the like to unlock a specific feature, a specific purpose, a specific asset, multiple features, multiple purposes, multiple assets, and/or the like based on the time and date provided from the transceiver 120 and/or the processor 114. In one aspect, the unlocking application 155 may unlock the wireless device for utilizing international wireless service from the international wireless service provider based on the time and date provided from the transceiver 120 and/or the processor 114.

The wireless device unlocking process 500 may include determining whether an end date of the wireless device unlocking has passed 516. This part of the process 500 may be associated with the graphical user interface 200 illustrated in FIG. 2 and/or FIG. 3 and the associated description thereof. However, this part of the process 500 may be implemented alternatively consistent with the disclosure. In one aspect, the time and date may be provided to the unlocking application 155 from the transceiver 120 and/or the processor 114.

The wireless device unlocking process 500 may include locking wireless device 518. This part of the process 500 may be associated with the graphical user interface 200 illustrated in FIG. 2 and/or FIG. 3 and the associated description thereof. However, this part of the process 500 may be implemented alternatively consistent with the disclosure.

In this regard, the unlocking application 155 may operate to provide a code, a command, a signal, and/or the like to control to the lock mechanism 164 or the like to lock a specific feature, a specific purpose, a specific asset, multiple features, multiple purposes, multiple assets, and/or the like based on the time and date provided from the transceiver 120 and/or the processor 114.

Figure 6:
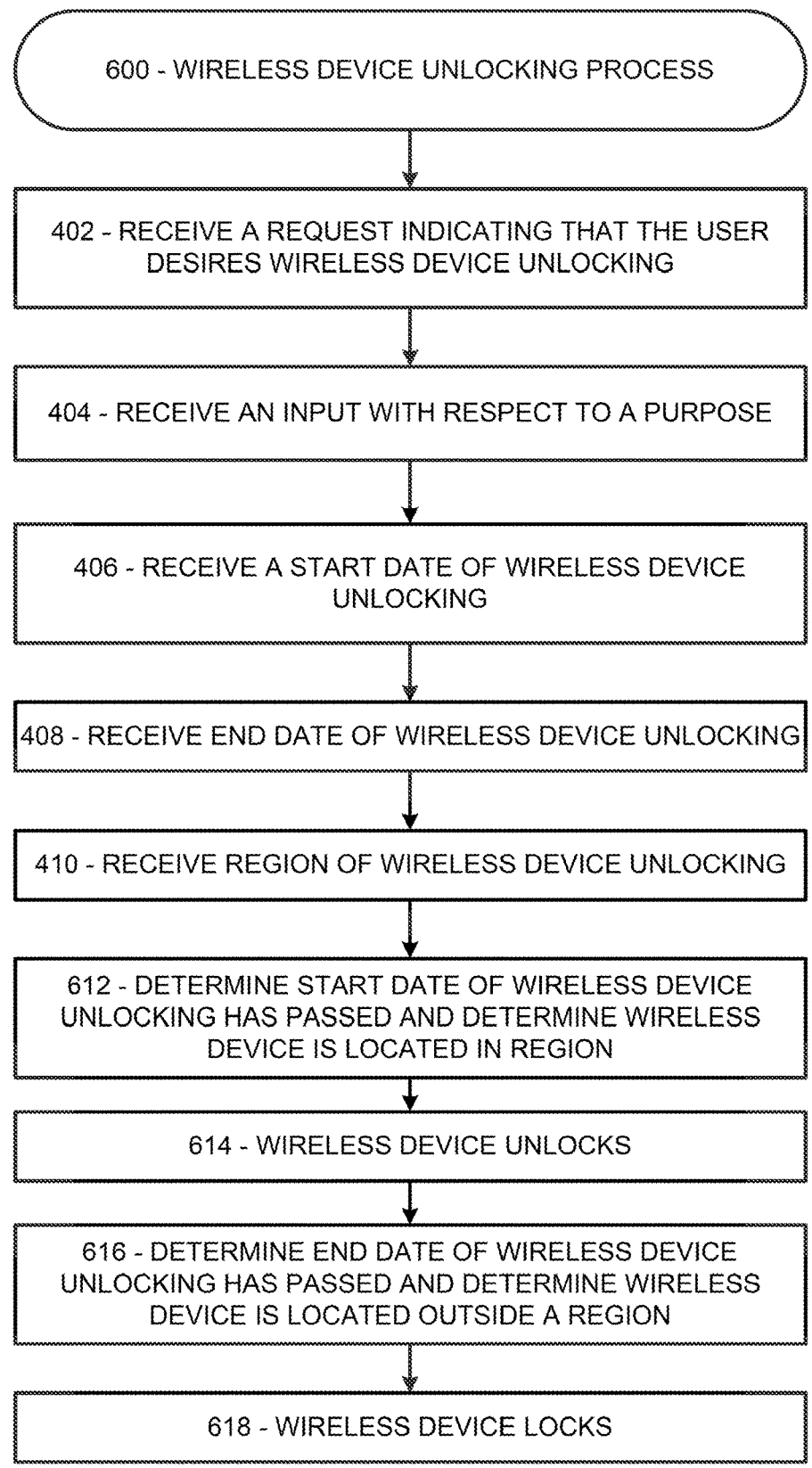
FIG. 6 illustrates an exemplary process that may be used to implement wireless device unlocking according to aspects of the disclosure.

FIG. 6 illustrates an exemplary process that may be used to implement wireless device unlocking according to aspects of the disclosure.

In particular, FIG. 6 illustrates a wireless device unlocking process 600 as described herein. It should be noted that the aspects of the wireless device unlocking process 600 may be performed in a different order consistent with the aspects described herein. Moreover, the wireless device unlocking process 600 may be modified to have more or fewer processes consistent with the various aspects disclosed herein. In this regard, aspects related to FIG. 6 may include any one or more features, processes, and/or the like as described herein. In particular, aspects related to FIG. 6 may include any one or more features, processes, and/or the like as described with respect to FIG. 4 and FIG. 5. Additionally, the wireless device unlocking process 600 may be implemented by the wireless device 104, the processor 114, and/or the like.

The wireless device unlocking process 600 may include determining a wireless device is located in a region and a start date of wireless device unlocking has passed 612. This part of the process 600 may be associated with the graphical user interface 200 illustrated in FIG. 2 and/or FIG. 3 and the associated description thereof. However, this part of the process 600 may be implemented alternatively consistent with the disclosure. In one aspect, the time and date may be provided to the unlocking application 155 from the transceiver 120 and/or the processor 114. In one aspect, the location of the wireless device 104 may be provided to the unlocking application 155 from the location determination device 130, the wireless network, and/or the processor 114.

The wireless device unlocking process 600 may include unlocking the wireless device 614. This part of the process 600 may be associated with the graphical user interface 200 illustrated in FIG. 2 and/or FIG. 3 and the associated description thereof. However, this part of the process 600 may be implemented alternatively consistent with the disclosure.

In this regard, the unlocking application 155 may operate to provide a code, a command, a signal, and/or the like to control to the lock mechanism 164 or the like to unlock a specific feature, a specific purpose, a specific asset, multiple features, multiple purposes, multiple assets, and/or the like based on the time and date provided from the transceiver 120 and/or the processor 114 and based on the location provided by the location determination device 130. In one aspect, the unlocking application 155 may unlock the wireless device for utilizing international wireless service from the international wireless service provider based on the time and date provided from the transceiver 120 and/or the processor 114.

The wireless device unlocking process 600 may include determining whether an end date of the wireless device unlocking has passed and determining whether the wireless device 104 is located outside a region 616. This part of the process 600 may be associated with the graphical user interface 200 illustrated in FIG. 2 and/or FIG. 3 and the associated description thereof. However, this part of the process 600 may be implemented alternatively consistent with the disclosure. In one aspect, the time and date may be provided to the unlocking application 155 from the transceiver 120 and/or the processor 114.

The wireless device unlocking process 600 may include locking wireless device 618. This part of the process 600 may be associated with the graphical user interface 200 illustrated in FIG. 2 and/or FIG. 3 and the associated description thereof. However, this part of the process 600 may be implemented alternatively consistent with the disclosure.

In this regard, the unlocking application 155 may operate to provide a code, a command, a signal, and/or the like to control to the lock mechanism 164 or the like to lock a specific feature, a specific purpose, a specific asset, multiple features, multiple purposes, multiple assets, and/or the like based on the time and date provided from the transceiver 120 and/or the processor 114 and based on the location provided by the location determination device 130.

Figure 7:
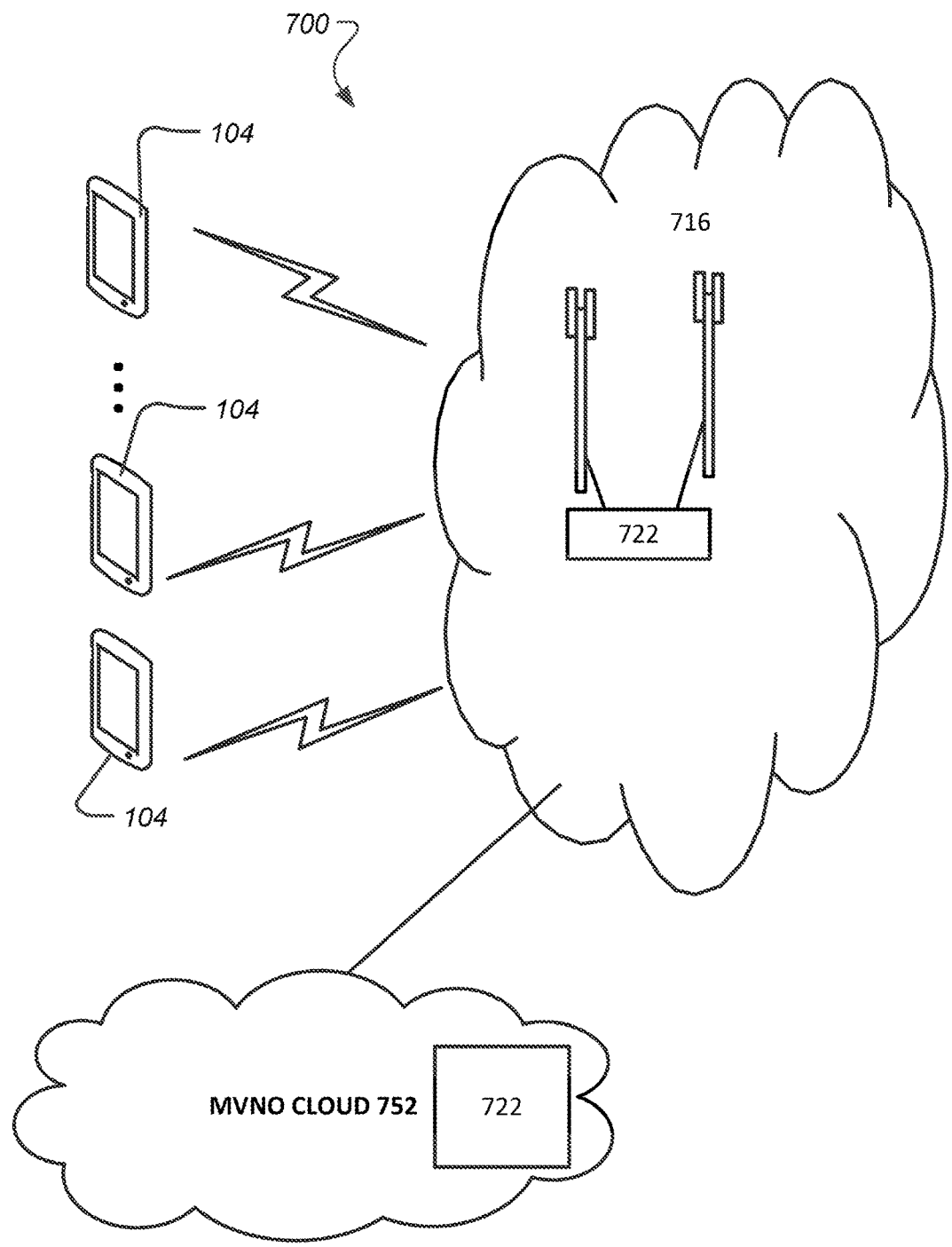
FIG. 7 illustrates an exemplary system according to aspects of the disclosure.

FIG. 7 illustrates an exemplary system according to aspects of the disclosure.

In particular, FIG. 7 illustrates a wireless network 716 and the wireless system 722. The wireless network 716 may include a radio access network (RAN). The RAN may be implemented as part of a mobile telecommunication system of the wireless network 716. The RAN may implement a radio access technology. The RAN may reside between the wireless device 104 and a core network (CN).

The wireless system 722 may be implemented by the wireless network 716 and/or the wireless system 722 may be implemented in a MVNO cloud 752. The wireless system 722 may be or may include a server supporting the unlocking system, device, and process as disclosed herein. In some aspects, the wireless system 722 connect with the wireless device 104 to receive the various information captured by the graphical user interface 200 as well as any other information from the wireless device 104 for the implementing the unlocking process. In some aspects, the wireless system 722 configured to transmit additional information, signaling, instructions, commands, and the like for implementing an unlocking process for the wireless device 104.

In some aspects, the wireless system 722 may receive a request indicating that the user desires wireless device unlocking. The wireless system 722 may receive information with respect to a purpose. The wireless system 722 may receive a start date of wireless device unlocking. The wireless system 722 may receive an end date of wireless device unlocking. The wireless system 722 may determine a wireless device is located in a region. The wireless system 722 may transmit additional information, signaling, instructions, commands, and the like for unlocking the wireless device 104 when wireless device 104 is located in a region and/or the start date has passed. The wireless system 722 may determine whether the wireless device 104 is located outside a region. The wireless system 722 may transmit additional information, signaling, instructions, commands, and the like for locking the wireless device 104 when wireless device 104 is outside a region and/or the end date has passed.

In some aspects, the wireless system 722 may unlock the wireless device 104 using various methods including, but not limited to, a network Over-the-air (OTA) unlocking which can be initiated by the customer/network via a high level operating system (HLOS) client, a TrustZone security extension, a Trusted Execution Environment (TEE) client/SMS using unlock codes/certificates as well as manual unlocking via entry of unlock codes by an end user.

In aspects relating to the unlocking application 155, the process 400, and/or the process 500, a payment transaction may be required and may be made through the graphical user interface of the unlocking application 155 implemented on the wireless device 104. Payment may include credit card payment, debit card payment, cash payment, electronic check, check, payment applications, store gift card, and the like. Payment applications can include but are not limited to, for example, Google Wallet™, PayPal™, Amazon Payments™, and the like. Thereafter, the wireless system 722 may receive the designated payment and authorize unlocking by the unlocking application 155, the process 400, and/or the process 500.

The wireless system 722 may verify the payment, the request, and/or the like. If the wireless system 722 finds the payment, the request, and the like is not approved, the process may be stopped. Upon stopping the process, the wireless system 722 may send a warning message to the wireless device 104. Alternatively, if the payment, the request, and/or the like is approved by the wireless system 722, authorization of the unlocking may take place. In this regard, the unlocking may be recorded in a database of the wireless system 722.

In particular, a wireless service system 700 may be used to purchase, procure, add, activate, authorize, provision and/or the like wireless services on the wireless device 104, which will be referred to as procuring wireless service for brevity hereinafter. In one aspect, the wireless service system 700 can be used to procure wireless services for a prepaid account associated with the wireless device 104. In one aspect, the wireless service system 700 can be used to procure wireless services for a prepaid account of the wireless device 104 associated with a unique identifier.

In one aspect, the phone user may input the unique identifier into the wireless device 104 utilizing an application that transmits the code to the wireless system 722. Thereafter, the wireless system 722 may update the prepaid account of the phone user consistent with the amount of wireless service.

In one aspect, the phone user may input the unique identifier into the wireless device 104 utilizing a web browser that launches a web portal implemented by the wireless system 722 that transmits the code to the wireless system 722. Thereafter, the wireless system 722 may update the prepaid account of the phone user consistent with the amount of wireless service.

In one aspect, the phone user may input the unique identifier into the wireless device 104 utilizing a text messaging application addressed to a designated short code that transmits the code to the wireless system 722. In this regard, in some aspects, the wireless system 722 may send various text messages to the phone user confirming receipt of the unique identifier. Thereafter, the wireless system 722 may update the prepaid account of the phone user consistent with the amount of wireless service.

In one aspect, the phone user may input the unique identifier into the internet-enabled device utilizing a web browser that launches a web portal implemented by the wireless system 722 that transmits the unique identifier to the wireless system 722. Thereafter, the wireless system 722 may update the prepaid account of the phone user consistent with the amount of wireless service.

In one aspect, the phone user may input the unique identifier into the wireless device 104 during a phone call to an Interactive Voice Response (IVR) system implemented by the wireless system 722 to deliver the unique identifier to the wireless system 722. Thereafter, the wireless system 722 may update the prepaid account of the phone user consistent with the amount of wireless service obtained.

The wireless network 716 may include a Mobility Management Entity (MME). The MME may function as a key control-node. The MME may be responsible for idle mode of the wireless device 104 as well as paging and tagging procedures including retransmissions. The MME may be involved in the bearer activation/deactivation process and may also responsible for choosing a Signaling Gateway (SGW) for the wireless device 104 at the initial attach and at a time of intra-LTE handover involving Core Network (CN) node relocation. The MME may be responsible for authenticating the wireless device 104 by interacting with a home subscriber server (HSS). Non Access Stratum (NAS) signaling may terminate at the MME and may also be responsible for generation and allocation of temporary identities to the wireless device 104. The MME may check the authorization of the wireless device 104 to camp on the service provider's Public Land Mobile Network (PLMN) and may enforce roaming restrictions on the wireless device 104. The MME may be a termination point in the wireless network 716 for ciphering/integrity protection for NAS signaling and may handle the security key management. The MME may also provide a control plane function for mobility between LTE and 2G/3G access networks with an S3 interface terminating at the MME from the Serving GPRS Support Node (SGSN). The MME may also terminate an S6a interface towards the home HSS for roaming wireless devices 104.

The SGW may be implemented as a network component responsible for transferring signaling messages (i.e. information related to call establishment, billing, location, short messages, address conversion, and other services) between Common Channel Signaling (CCS) nodes that communicate using different protocols and transports.

The wireless network 716 may include the home subscriber server (HSS), or user profile server function (UPSF). The HSS may be a master user database that supports IP Multimedia Core Network Subsystem (IMS) network entities. It may contain the subscription-related information (subscriber profiles), performs authentication and authorization of the user, and can provide information about the subscriber's location and IP information. In other aspects, the wireless networks 716 may be implemented without the home subscriber server (HSS).

The wireless network 716 may include a public data network (PDN) gateway (PDN GW). The PDN GW may contain devices such as protocol translators, impedance matching devices, rate converters, fault isolators, or signal translators as necessary to provide system interoperability. The PDN GW may also require the establishment of mutually acceptable administrative procedures between networks.

The PDN may be a circuit-switched or packet-switched network that can transmit data in digital form. The PDN may provide any of X.25, frame relay, cell relay (ATM), and/or the like services. Access to a PDN generally includes a guaranteed bandwidth, known as the committed information rate (CIR).

The wireless network 716 may include an S5/S8 interface that may be used within the Evolved Packet Core (EPC) for LTE. The S5 interface may provide user plane tunneling and tunnel management between a serving GW and PDN GW. It may be used for Serving GW relocation due to wireless device 104 mobility and if the serving GW needs to connect to a non-collocated PDN GW for the required PDN connectivity.

The wireless network 716 may further include an Online Charging System (OCS). The OCS may be a system allowing a communications service provider to charge their customers, in real time, based on service usage. The OCS may communicate with a billing component.

The wireless network 716 may further include a Policy and Charging Rules Function (PCRF). The PCRF may be a software node designated in real-time to determine policy rules in a multimedia network. In some aspects, the PCRF may be a policy tool. The PCRF may be a component that operates at the network core and accesses subscriber databases and other specialized functions, such as a charging system, in a centralized manner. The PCRF may be part of the network architecture that aggregates information to and from the wireless network 716, operational support systems, and other sources (such as portals) in real time, supporting the creation of rules and then automatically making policy decisions for each subscriber active on the network. The PCRF may communicate with a billing component.

The Customer Relationship Management (CRM) may be an integrated management information system that is used to schedule, plan, and control the activities for the wireless network 716. The CRM may include hardware, software, and networking tools to improve customer tracking and communication.

In some aspects, the wireless network 716 may include an S8 interface. The S8 interface may provide an inter-PLMN reference point providing user and control plane between the Serving GW in the VPLMN and the PDN GW and the HPLMN. S8 is the inter PLMN variant of S5. In some aspects, the wireless network 716 may include Gx signaling. The Gx signaling may provide an on-line policy interface between the GGSN and the charging rules function (CRF). It may be used for provisioning service data flow based on charging rules. The Gx signaling may utilize the diameter protocol. In some aspects, the wireless network 716 may include Gy signaling. The Gy signaling may be an on-line charging interface between the GGSN and the online charging system (OCS). The Gy signaling may utilize the diameter protocol.

In alternative or additional aspects, the wireless network 716 may include a base transceiver station (BTS), a base station controller (BSC), and a mobile switching center (MSC) overseen by a network operator. Other types of wireless networks utilizing a communication channel as defined herein are contemplated as well. The wireless network 716 may communicate with the wireless device 104 over a communication channel as defined herein.

In one aspect, the wireless device 104 may utilize an internal accounting module to establish an account with a representation of prepaid funds or available credit for wireless services. In some aspects, the internal accounting module of the wireless device 104 may also be used to store and/or transmit a plurality of charge rates as well as a billing/payment algorithm. The internal accounting module can monitor and classify each wireless service used (voice call service, data service, text messaging service, and service days) into one of a plurality of billing categories. Select a charge rate corresponding to that billing category. Calculate an appropriate charge for the voice call service, data service, text messaging service, and service days in real time by using the selected charge rate. Finally, apply this charge to a prepaid account. Thereafter, the resulting wireless service usage is debited from the prepaid account. Additionally, the amount in the prepaid account can be increased as described herein.

In other aspects, the wireless device 104 and the wireless network may form a hybrid system that together or individually monitor the wireless service utilized by the wireless device. In this regard, the hybrid system may store and/or transmit a plurality of charge rates as well as a billing/payment algorithm. The hybrid system can monitor and classify each wireless service used (voice call service, data service, text messaging service, and service days) into one of a plurality of billing categories. Select a charge rate corresponding to that billing category. Calculate an appropriate charge for the data usage, voice usage, service days, and SMS usage in real time by using the selected charge rate. Finally, apply this charge to a prepaid account. In other words, the resulting wireless service usage is debited from the prepaid account. Additionally, the amount in the prepaid account can be increased as described herein. In this aspect, the disclosure may utilize the teachings of U.S. patent application Ser. No. 13/669,838, filed Nov. 6, 2012, titled Hybrid Network Based Metering Server and Tracking Client for Wireless Services by the assignee of the present disclosure, which is incorporated by reference in its entirety.

In yet other aspects, the wireless network may monitor the wireless service utilized by the wireless device 104. This aspect may be implemented in a MNO, MVNO, or both types of wireless networks. In this regard, the wireless network may store and/or transmit a plurality of charge rates as well as a billing/payment algorithm. The wireless network can monitor and classify each wireless service used (voice call service, data service, text messaging service, and service days) into one of a plurality of billing categories. Select a charge rate corresponding to that billing category. Calculate an appropriate charge for the data usage, voice usage, service days, and SMS usage in real time by using the selected charge rate. Finally, apply this charge to a prepaid account. In other words, the resulting wireless service usage is debited from the prepaid account. Additionally, the amount in the prepaid account can be increased as described herein. In this aspect, the disclosure may utilize the teachings of U.S. patent application Ser. No. 15/215,985, filed Jul. 21, 2015, titled System, Process and Device for Multiple Network Usage Tracking by the assignee of the present disclosure, which is incorporated by reference in its entirety.

In some aspects, once it is determined that the amount of wireless service (voice call service, data service, text messaging service, and/or service days) used has depleted the account to zero, the processor 114 may interact with the internal accounting module and/or the wireless system 722 to limit, prevent, alert the user, and/or control further use of the wireless device 104. In some aspects, once the wireless network determines that the amount of wireless service (data, voice, service days, and/or SMS) used has depleted the account to zero, the wireless system 722 may limit, prevent, alert the user, and/or control further use of the wireless device 104 as further described herein.

The controlled use can include suspending voice calls, allowing limited voice calls, allowing all voice calls, suspending text messages, allowing limited text messages, allowing all text messages, suspending wireless data service, limiting wireless data service, throttling wireless data service, and allowing all wireless data service.

Accordingly, the disclosure has provided a more convenient and/or flexible approach for unlocking wireless devices for users desiring unlocking of wireless devices to modify or obtain access to various assets or functions of the wireless device. The disclosure has further provided a more convenient and/or flexible approach for unlocking wireless devices for users desiring temporary unlocking of wireless devices to modify or obtain access to various assets or functions of the wireless device.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be beneficial due to the ubiquity of web browsers and the convenience of using a web browser as a client (i.e., thin client). Further, with inherent support for cross-platform compatibility, the web application may be maintained and updated without distributing and installing software on each.

The web portal may be a specially designed website that brings information from diverse sources. In some aspects, each information source gets a dedicated area on the page for displaying information (a portlet). In some aspects, the portal may include mashups and intranet "dashboards." The portal may use an application programming interface (API). The portal may provide a way for enterprises and organizations with access control, modification, procedures, and the like for multiple applications and databases. The features available may be restricted to an authorized and authenticated user (employee, member).

The term text messaging service, text message, or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, and 5G networks or networks associated with the communication channel as defined herein. In other aspects, text message may include Multimedia Messaging Service (MMS), which is a standard way to send messages that include multimedia content to and from smartphones. It extends the core SMS (Short Message Service) capability that allowed exchange of text messages only up to 160 characters in length. While a popular use is to send photographs from camera-equipped handsets, it is also used as a method of delivering news and entertainment content including videos, pictures, text pages, and ringtones. MMS can be used within the context of the present invention for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

The term voice call service, voice, or voice calls as utilized herein may include voice calls defined by 3GPP (3rd Generation Partnership Project) with Voice Call Continuity (VCC) specifications in order to describe how a voice call can be persisted, as a mobile phone moves between circuit switched and packet switched radio domains (3GPP TS 23.206).

The term data service or data as utilized herein includes mobile broadband or wireless Internet access delivered through mobile phone towers over a communication channel as defined herein to computers, smartphones, wireless devices, and other digital devices as defined herein using portable modems. Some mobile services allow more than one device to be connected to the Internet using a single cellular connection using a process called tethering.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), 5G (fifth generation), W-CDMA (Wideband Code-Division Multiple Access), Wireless Fidelity (Wi-Fi), Bluetooth, Near field communication (NFC), and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

The disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

The application described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, and/or the like. In some aspects, the application may be obtained from Google Play™, Android Market™, Apple Store™, and/or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

For the purposes of this disclosure a computer readable medium stores computer data, which data can include computer program code that is executable by a processor in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm, or module may reside as one or any combination or set of codes and/or instructions on a computer readable medium or machine readable medium, which may be incorporated into a computer program product.

As used herein interactive voice response (IVR) is a technology that allows a computer to interact with humans through the use of voice and DTMF tones input via keypad. In telecommunications, IVR allows customers to interact with a host system via a telephone keypad or by voice recognition, after which they can service their own inquiries by following the IVR dialogue. IVR systems can respond with prerecorded or dynamically generated audio to further direct users on how to proceed. IVR applications can be used to control almost any function where the interface can be broken down into a series of simple interactions.

According to an example, the global navigation satellite system (GNSS) may include a device and/or system that may estimate its location based, at least in part, on signals received from space vehicles (SVs) for the wireless device 104. In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may include, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A wireless device configured to temporarily unlock comprising:
 a non-transitory memory configured to store instructions to implement an unlocking application;
 a display configured to display a user interface having a prompt to input information in response to the unlocking application, wherein the inputted information (i) indicates a purpose and (ii) is selected from among one or more other purposes;
 a transceiver configured to wirelessly communicate with a wireless network;
 a processor, operatively coupled to the non-transitory memory and the display, the processor configured to execute the unlocking application;
 a lock mechanism configured to lock one of the following: a specific feature, a specific purpose, a specific asset, multiple features, multiple purposes, or multiple assets, wherein the lock mechanism is configured to be implemented as a SIM lock, a network lock, a carrier lock, a subsidy lock, a master subsidy lock, a locking mechanism, service programming code (SPC), a master subsidy lock (MSL) lock, a universal serial bus (USB) lock, or a port access lock;
 a location determination device configured to estimate a location of the wireless device;

the processor implementing the unlocking application being configured to control the lock mechanism to unlock one of the following: a specific feature, a specific purpose, a specific asset, multiple features, multiple purposes, or multiple assets; and the processor implementing the unlocking application being configured to control the lock mechanism and the processor configured to unlock based on one of the following: the indicated purpose being for international wireless service based on the estimated location or a time and date provided from the transceiver and/or the processor.

2. The wireless device according to claim 1, wherein the lock mechanism is configured to be implemented as a subsidy lock.

3. The wireless device according to claim 1,
wherein the location is provided to the unlocking application from the location determination device; and
wherein the location determination device estimates a location based on a global navigation satellite system (GNSS).

4. The wireless device according to claim 1, wherein:
the processor implementing the unlocking application being configured to control the lock mechanism to lock one of the following: a specific feature, a specific purpose, a specific asset, multiple features, multiple purposes, or multiple assets; and
the processor implementing the unlocking application being configured to control the lock mechanism to lock based on one of the following: the location provided by the location determination device or based on a time and date provided from the transceiver and/or the processor.

5. The wireless device according to claim 1, wherein the display and the user interface are configured to generate, display, and/or include an input on one or more screens to receive a start date of unlocking for the wireless device unlocking.

6. The wireless device according to claim 1, wherein the display and the user interface are configured to generate, display, and/or include an input on one or more screens to receive an end date of unlocking for the wireless device unlocking.

7. A process for temporarily unlocking a wireless device comprising:
storing instructions to implement an unlocking application in a non-transitory memory;
displaying a user interface having a prompt to input information in response to the unlocking application on a display, wherein the inputted information (i) indicates a purpose and (ii) is selected from among one or more other purposes;
wirelessly communicating with a wireless network with a transceiver;
executing the unlocking application with a processor, operatively coupled to the non-transitory memory and the display;
configuring a lock mechanism to lock one of the following: a specific feature, a specific purpose, a specific asset, multiple features, multiple purposes, or multiple assets wherein the lock mechanism is configured to be implemented as one of the following: a SIM lock, a network lock, a carrier lock, a subsidy lock, a master subsidy lock, a locking mechanism, service programming code (SPC), a master subsidy lock (MSL) lock, a universal serial bus (USB) lock, or a port access lock;
estimating a location of the wireless device with a location determination device; implementing the unlocking application with the processor to control the lock mechanism to unlock one of the following: a specific feature, a specific purpose, a specific asset, multiple features, multiple purposes, or multiple assets; and
implementing the unlocking application with the processor to control the lock mechanism and the processor configured to unlock based on one of the following: the indicated purpose being for international wireless service based on the estimated location or a time and date provided from the transceiver and/or the processor.

8. The process for temporarily unlocking a wireless device according to claim 7, wherein the lock mechanism is configured to be implemented as a subsidy lock.

9. The process for temporarily unlocking a wireless device according to claim 7,
wherein a location is provided to the unlocking application from the location determination device; and
wherein the location determination device estimates a location based on a global navigation satellite system (GNSS).

10. The process for temporarily unlocking a wireless device according to claim 7, wherein:
the processor implementing the unlocking application being configured to control the lock mechanism to lock one of the following: a specific feature, a specific purpose, a specific asset, multiple features, multiple purposes, or multiple assets; and
the processor implementing the unlocking application being configured to control the lock mechanism to lock based on one of the following: the location provided by the location determination device or based on a time and date provided from the transceiver and/or the processor.

11. The process for temporarily unlocking a wireless device according to claim 7, wherein the display and the user interface are configured to generate display, and/or include an input on one or more screens to receive a start date of unlocking for the wireless device unlocking.

12. The process for temporarily unlocking a wireless device according to claim 7, wherein the display and the user interface are configured to generate display, and/or include an input on one or more screens to receive an end date of unlocking for the wireless device unlocking.

13. A wireless device configured to temporarily unlock comprising:
a non-transitory memory configured to store instructions to implement an unlocking application;
a display configured to display a user interface having a prompt to input information in response to the unlocking application, wherein the inputted information (i) indicates a purpose and (ii) is selected from among one or more other purposes;
a transceiver configured to wirelessly communicate with a wireless network;
a processor, operatively coupled to the non-transitory memory and the display the processor configured to execute the unlocking application;
a lock mechanism configured to lock one of the following: a specific feature, a specific purpose, a specific asset, multiple feature, multiple purposes, or multiple assets, wherein the lock mechanism is configured to be implemented as one of the following: a SIM lock, a network lock, a carrier lock, a subsidy lock, a master subsidy lock, a locking mechanism, service programming code (SPC), a master subsidy lock (MSL) lock, a universal serial bus (USB) lock, or a port access lock;
a location determination device configured to estimate a location of the wireless device;
the processor implementing the unlocking application being configured to control the lock mechanism to unlock one of the following: a specific feature, a specific purpose, a specific asset, multiple features, multiple purposes, or multiple assets;
the processor implementing the unlocking application being configured to control the lock mechanism and the processor configured to unlock based on one of the following: the location provided by the location determination device to the processor or based on a time and date provided from the transceiver and/or the processor;
the processor implementing the unlocking application being configured to control the lock mechanism to lock one of the following: a specific feature, a specific purpose, a specific asset, multiple features, multiple purposes, or multiple assets; and
the processor implementing the unlocking application being configured to control the lock mechanism and the processor configured to lock based on one of the following: the indicated purpose being for international wireless service based on the estimated location or a time and date provided from the transceiver and/or the processor.

14. The wireless device according to claim 13, wherein the lock mechanism is configured to be implemented as a subsidy lock.

15. The wireless device according to claim 13, wherein the location is provided to the unlocking application from the location determination device; and
wherein the location determination device estimates a location based on a global navigation satellite system (GNSS).

16. The wireless device according to claim 13, wherein the display and the user interface are configured to generate, display, and/or include an input on one or more screens to receive a start date of unlocking for the wireless device unlocking.

17. The wireless device according to claim 13, wherein the display and the user interface are configured to generate, display, and/or include an input on one or more screens to receive an end date of unlocking for the wireless device unlocking.

* * * * *